United States Patent
Girard et al.

(10) Patent No.: US 12,331,659 B2
(45) Date of Patent: Jun. 17, 2025

(54) TURBINE BLADE OF A TURBINE ENGINE WITH SELF-GENERATED INTERLOCK CONTACT FORCE IN OPERATION

(71) Applicants: SAFRAN AIRCRAFT ENGINES, Paris (FR); SAFRAN CERAMICS, Le Haillan (FR)

(72) Inventors: Patrick Joseph Marie Girard, Moissy-Cramayel (FR); Didier René André Escure, Moissy-Cramayel (FR); Matthieu Arnaud Gimat, Moissy-Cramayel (FR); Sébastien Serge Francis Congratel, Moissy-Cramayel (FR); Arthur De Castro, Moissy-Cramayel (FR)

(73) Assignees: SAFRAN AIRCRAFT ENGINES, Paris (FR); SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/699,150

(22) PCT Filed: Sep. 30, 2022

(86) PCT No.: PCT/FR2022/051853
§ 371 (c)(1),
(2) Date: Apr. 5, 2024

(87) PCT Pub. No.: WO2023/057707
PCT Pub. Date: Apr. 13, 2023

(65) Prior Publication Data
US 2024/0263560 A1 Aug. 8, 2024

(30) Foreign Application Priority Data
Oct. 7, 2021 (FR) ...................................... 2110651

(51) Int. Cl.
*F01D 5/30* (2006.01)
*F01D 5/14* (2006.01)
*F01D 9/04* (2006.01)

(52) U.S. Cl.
CPC ........... *F01D 5/3084* (2013.01); *F01D 5/141* (2013.01); *F01D 9/041* (2013.01); *F05D 2300/6033* (2013.01)

(58) Field of Classification Search
CPC ........ F01D 11/005; F01D 11/006; F01D 9/04; F01D 9/041; F01D 9/042; F01D 5/22; F01D 5/3084
See application file for complete search history.

(56) References Cited

U.S. PATENT DOCUMENTS 4,623,298 A * 11/1986 Hallinger ................. F01D 5/225
 415/174.4
4,710,102 A * 12/1987 Ortolano ................. F01D 5/225
 416/190

(Continued)

FOREIGN PATENT DOCUMENTS

| EP | 2808491 A1 * | 12/2014 | ............. F01D 9/041 |
| FR | 2970999 A1 | 8/2012 | |
| FR | 3081915 A1 | 12/2019 | |

OTHER PUBLICATIONS

Search Report and Written Opinion issued in International Application No. PCT/FR2022/051853, mailed Jan. 27, 2023.

(Continued)

*Primary Examiner* — Kenneth Bomberg
*Assistant Examiner* — Cameron A Corday
(74) *Attorney, Agent, or Firm* — Bookoff McAndrews, PLLC

(57) ABSTRACT

Blade of a turbomachine turbine including a airfoil extending along a first direction between an internal end and an external end, a base secured to said internal end, and a root secured to said external end and extending, along a second direction perpendicular to said first direction, between an upstream edge and a downstream edge and, along a third direction orthogonal to the first and second directions, between first and second lateral edges, the first side edge having, in a plane including the second and third directions, a shape complementary to that of the second lateral edge. The first lateral edge includes a first portion extending from the upstream edge, and a second portion externally protruding along the third direction at an acute angle with the first portion.

18 Claims, 6 Drawing Sheets

(56) References Cited

U.S. PATENT DOCUMENTS

| | | | | |
|---|---|---|---|---|
| 4,948,338 A | * | 8/1990 | Wickerson | F01D 5/187 |
| | | | | 416/189 |
| 5,154,581 A | * | 10/1992 | Borufka | F01D 5/225 |
| | | | | 416/190 |
| 8,573,939 B2 | * | 11/2013 | Borufka | F01D 5/225 |
| | | | | 416/190 |
| 8,961,135 B2 | * | 2/2015 | Beeck | F01D 11/003 |
| | | | | 416/193 A |
| 9,045,989 B2 | * | 6/2015 | Stiehler | F01D 5/26 |
| 10,018,066 B2 | * | 7/2018 | Rioux | F01D 5/02 |
| 11,092,022 B2 | * | 8/2021 | Sobanski | F01D 5/282 |
| 2003/0044282 A1 | * | 3/2003 | Zhu | F01D 5/143 |
| | | | | 416/193 A |
| 2012/0195766 A1 | * | 8/2012 | Cohin | F01D 5/225 |
| | | | | 416/241 A |
| 2013/0108448 A1 | * | 5/2013 | Ingram | F01D 5/143 |
| | | | | 29/889.7 |
| 2020/0408099 A1 | | 12/2020 | Loisel et al. | |

OTHER PUBLICATIONS

Search Report issued in French Application No. 2110651, mailed May 20, 2022.

* cited by examiner

[Fig. 1]
PRIOR ART
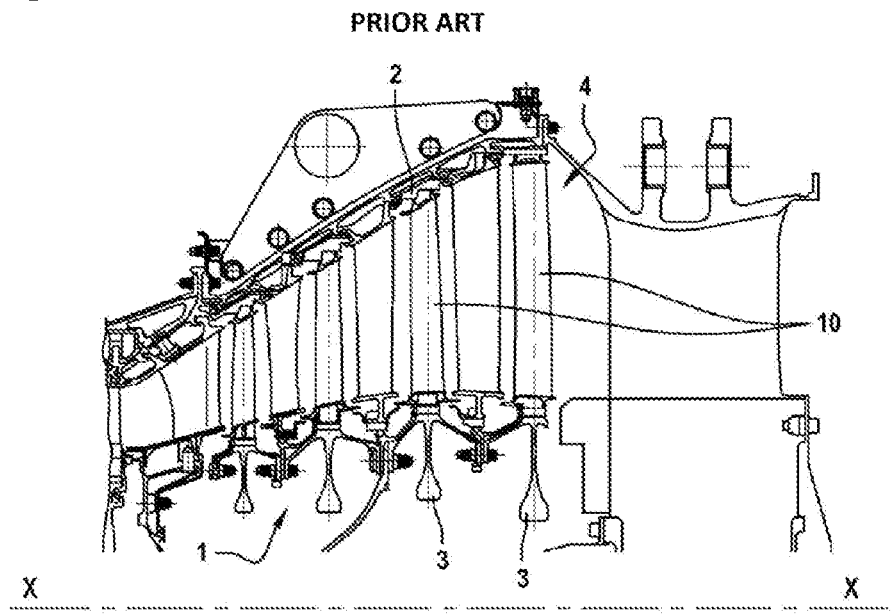
[Fig. 2]
PRIOR ART
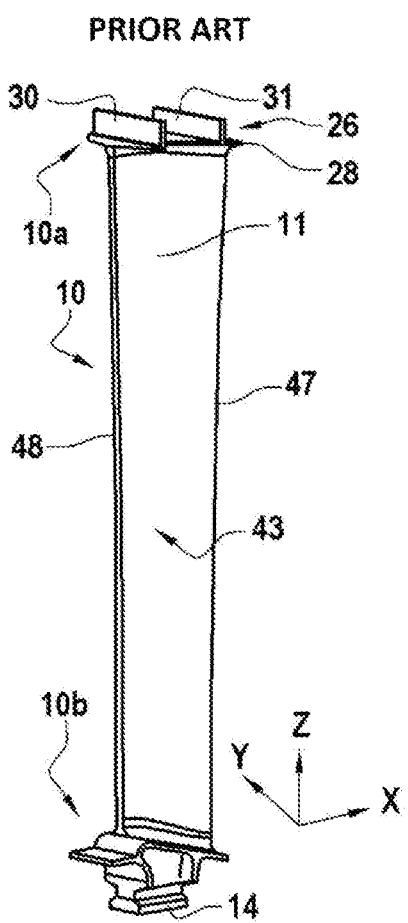

[Fig. 3]
PRIOR ART
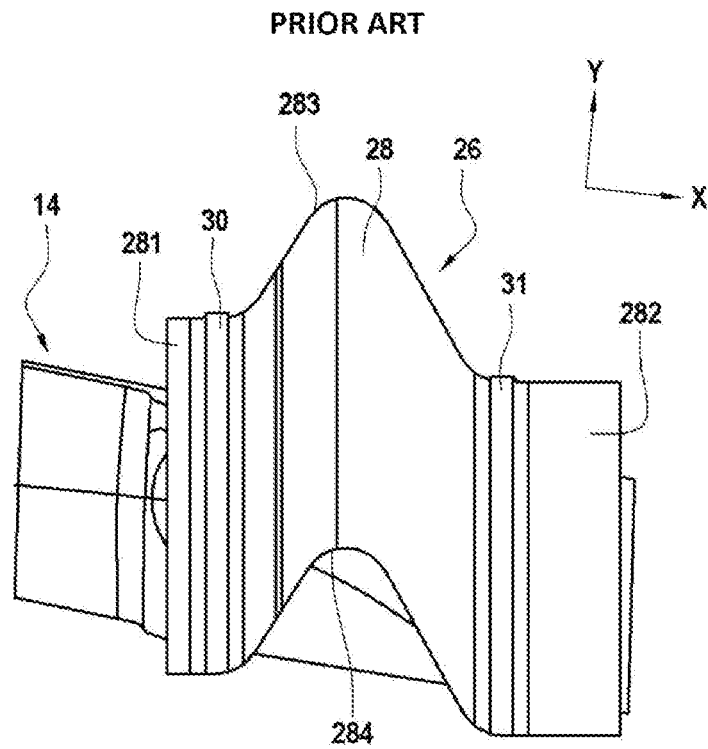
[Fig. 4]
PRIOR ART
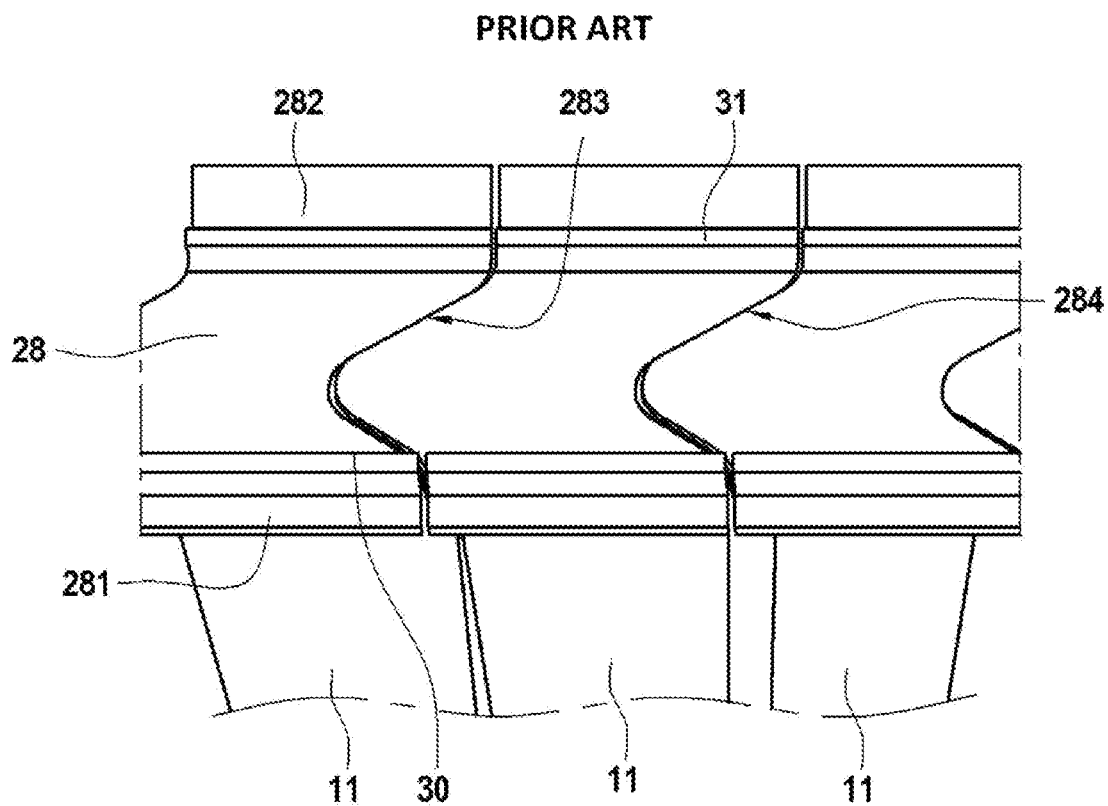

[Fig. 5]
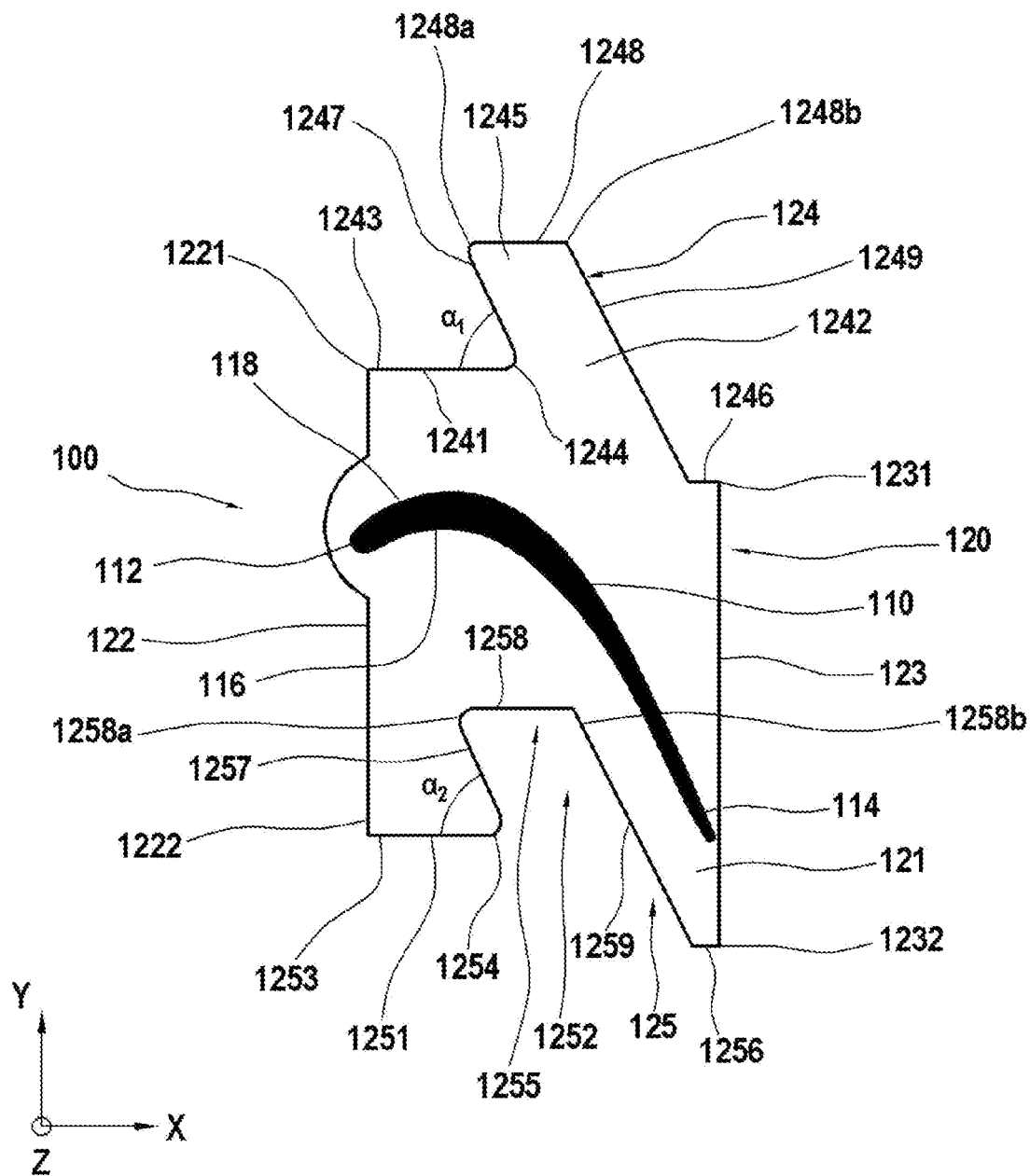

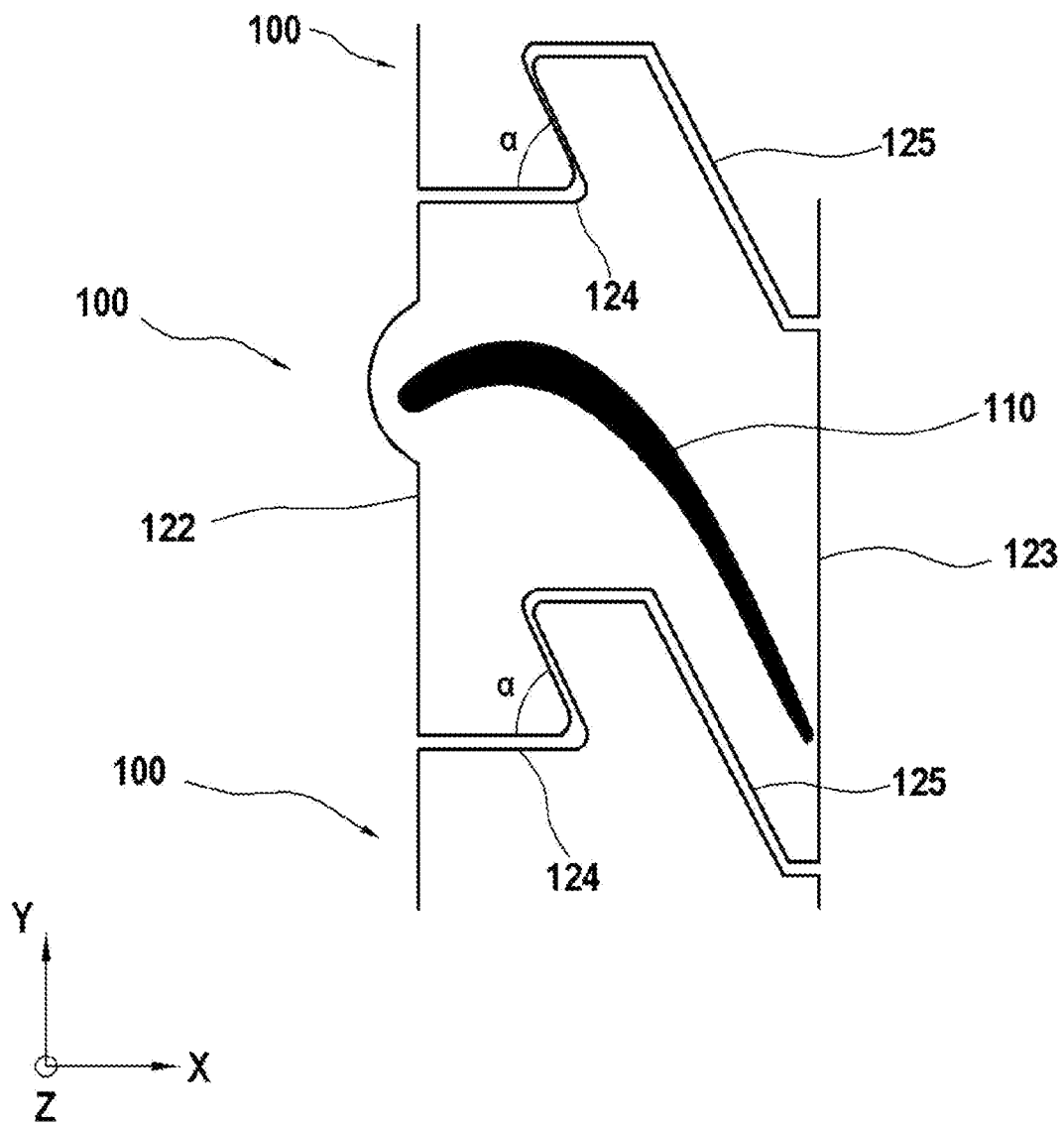
[Fig. 6]

[Fig. 7]
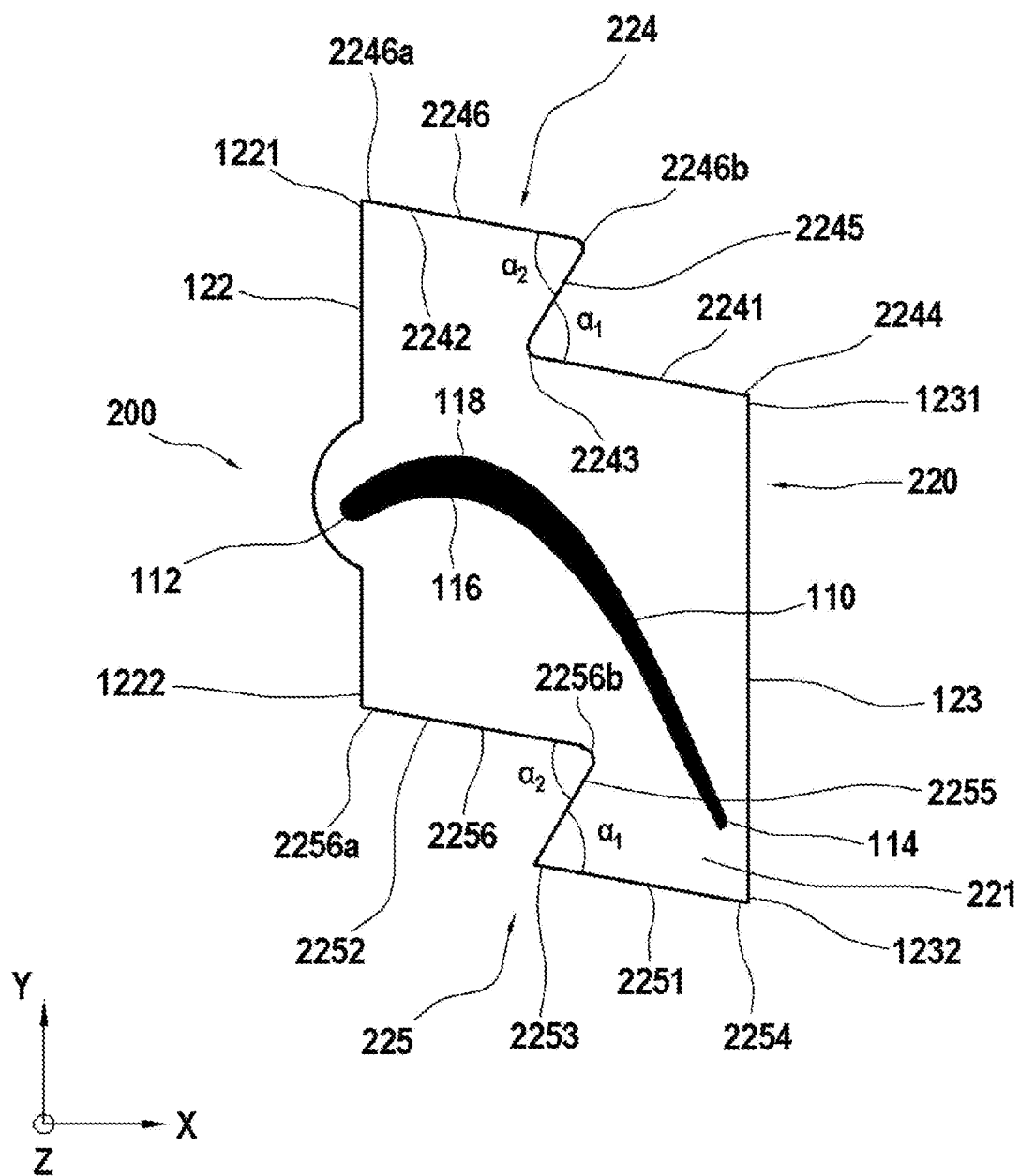

[Fig. 8]
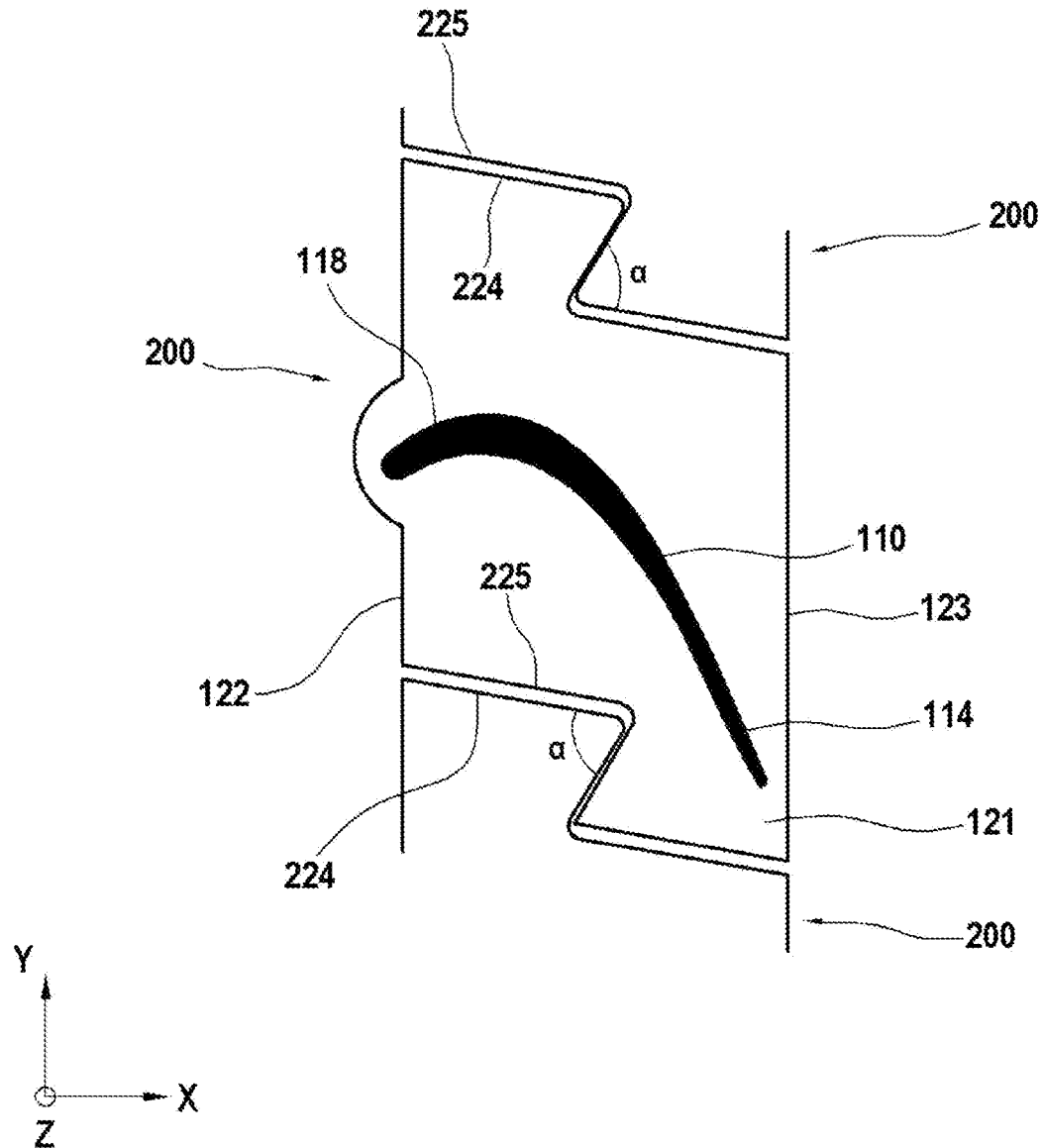

TURBINE BLADE OF A TURBINE ENGINE WITH SELF-GENERATED INTERLOCK CONTACT FORCE IN OPERATION

CROSS-REFERENCE TO RELATED APPLICATIONS

This is a National Stage Application under 35 U.S.C. § 371 of International Application No. PCT/FR2022/051853, filed Sep. 30, 2022, now published as WO 2023/057707 A1, which claims priority to French Patent Application No. 2110651, filed on Oct. 7, 2021.

TECHNICAL FIELD

The invention relates to the blades of a turbomachine turbine, in particular aeronautical turbine engines or industrial turbines, and more particularly to rooted blades that are made of ceramic matrix composite material, hereinafter referred to as CMC material.

The invention in particular applies to blades of a low-pressure turbine of a turbomachine of an aircraft, but can also be applied to blades of other modules, vane assemblies, multi-airfoil parts, on the condition of integrating a root or a platform. By blades, it is meant blades of a bladed wheel which rotates about an axis of rotation.

PRIOR ART

In the present application, the terms "upstream" and "downstream" are defined in relation to the of normal gas flow direction (from upstream to downstream) through a turbomachine. The axis of rotation of the rotor of the turbomachine is also called "axis of the turbomachine" or "drive axis". The axial direction corresponds to the direction of the axis of the turbomachine and a radial direction is a direction perpendicular to the axis of the turbomachine and intersecting this axis. Likewise, an axial plane is a plane containing the axis of the turbomachine, and a radial plane is a plane perpendicular to this axis.

In a turbomachine as represented in FIG. 1, a low-pressure turbine 4 recovers part of the energy resulting from the combustion of gases for the operation of the fan, the compressor and the accessories of the turbomachine. One of the constituent elements of the low-pressure turbine 4 is the rotor 1 which is an assembly of disks and blades 10 on a shaft. The rotor 1 includes a plurality of stages of blades 10, the blades being radially arranged about the axis of rotation XX of the rotor 1.

A blade 10, as represented in FIG. 2, includes an airfoil 11 which extends along a radial direction Z between a proximal end 10b (radially inner end) and a distal end 10a (radially outer end) of the blade 10. In other words, the airfoil 11 extends along a direction orthogonal to the axis of rotation XX of the rotor 1. The airfoil 11 includes an extrados face (not visible in FIG. 2) and an intrados face 43 connected upstream by a leading edge 48 and downstream by a trailing edge 47.

At the proximal end 10b of the airfoil 11, the blade 10 comprises a base 14 allowing it to be fixed to a disk 3 of the rotor 1, and more particularly in a cell complementary to the disk 3. The disk 3 conventionally includes a plurality of cells radially distributed on its circumference to receive several blade 10 bases 14. The airfoil 11 makes it possible to recover the forces of the gases passing through the turbomachine to transmit them to the disk 3 of the rotor 1.

At the distal end 10a of the airfoil 11, the blade 10 includes a transverse platform 26, more commonly called root.

The turbine blades 10 are conventionally subject to vibratory excitations in drive operation.

A known solution for limiting the vibratory responses and stresses is the introduction of a frictional contact technology between the roots 26 of the adjacent blades 10, in order to provide damping to the system. This technology is called pre-torsion technology or interlock.

This technology is characterized by a specific cutting of the lateral faces of the root, with an excrescence on the extrados side, and a complementary recess on the intrados side. During the mounting, the contacting is generated on these patterns through an angular deformation of the airfoil (=the pre-torsion).

The vibrations of the blade in operation induce relative slips at the level of this contact area which, coupled with the contact pressures, create friction damping.

The damping provided by the technology called pre-torsion technology is strongly related to the value of the inter-blade contact force. A force is conventionally installed by design from the mounting, however, the shapes of the deformed blades in operation and the relative displacements of the adjacent roots can vary this force, in particular at high speed where the vibratory loads are exacerbated. In the case of a downward variation, it is necessary to amplify the force during the mounting, which results in induced static over-stresses. This scenario is particularly hampering for blades made of CMC material whose mechanical allowables are low, and could even be blocking.

To illustrate this, FIG. 3 more specifically shows the upper part of the blade 10 and more specifically a top view of the root 26 of the blade 10 represented in FIG. 2. The root 26 includes a platform 28 having an upstream spoiler 281 and a downstream spoiler 282 extending transversely relative to the direction of flow of the gases (along the axis X). The two spoilers 281 and 282 are connected together by two lateral edges 283 and 284 having a profile called V-shaped or Z-shaped profile. The platform 28 has a first lateral edge 283 positioned on the extrados side of the airfoil 11 and a second lateral edge 284 positioned on the intrados side of the airfoil 11. To differentiate these two lateral edges, the lateral edge of the platform 28 located on the extrados side of the airfoil 11 will hereafter be called "extrados lateral edge 283", and "the lateral edge of the platform 28 located on the intrados side of the airfoil 11 will hereafter be called "intrados lateral edge 284".

The root 26 further includes two wipers 30 and 31 protruding relative to the platform 28 and extending along a transverse direction relative to the direction of flow of the gases (along the axis X). The wipers 30 and 31 ensure the sealing by complementarity with a stator 2, visible in FIG. 1, during the operation of the low-pressure turbine 4.

When the blades 10 are mounted in a ring on the disk 3, each platform 28 is in contact with two other platforms 28 of two adjacent blades 10, and more specifically by contact of the lateral edges 283, 284 as illustrated in FIG. 4. The shape of the platforms 28 makes it possible to put the blades 10 under torsional stress when they are in position on the disk 3, in particular by bearing a blade with the neighboring blades at the level of the lateral edges 283, 284 of the platforms 28. This stressing makes it possible in particular to dampen the vibrations to which they are subjected in operation.

A particularity of the state of the technology is the fact that in drive operation, the inter-root contact force can change compared to the mounting case. This effect can be caused either by the natural rotation of the airfoil (clockwise or counterclockwise), or by the relative movement of the adjacent roots (displacement closer or away to each other).

In the case of a downward variation of the inter-root contact force, it is necessary to amplify the force during the mounting to aim for the target force at high speed where cushioning is sought. This adaptation results in static over-stresses.

The main problem is encountered in the case of blades made of CMC material, due to the low mechanical allowables on this family of material which make the blades poorly tolerant to pre-torsion. Thus, for a CMC blade, a strong pre-torsion during mounting induces high static stresses with regard to the allowable, and sometimes even beyond.

It is also noted that the CMC expands three times less than the usual metal materials for the blades. This results in a displacement of the adjacent roots away from each other when hot, and therefore, for the configuration of the state of the art, in a reduction of the contact force in operation.

DISCLOSURE OF THE INVENTION

The invention aims to overcome the drawbacks mentioned above and to overcome the difficulties mentioned above by proposing turbomachine turbine blades with inter-root contact topologies making it possible to naturally increase the contact force in operation of the engine, and particularly at high speed where the vibratory loads are the greatest.

One object of the invention proposes a turbomachine blade, the blade comprising an airfoil extending along a first direction between an internal end and an external end, a blade base secured to the internal end of the airfoil, and a root secured to the external end of the airfoil, the root including a platform delimited, on the one hand, along a second direction perpendicular to said first direction by an upstream edge and a downstream edge and, on the other hand, along a third direction orthogonal to the first direction and to the second direction by a first lateral edge and a second lateral edge, the first lateral edge having, in a plane comprising the second and third directions, a shape complementary to the shape of the second lateral edge.

According to a general characteristic of the invention, the first lateral edge comprises a first portion extending from the upstream edge or the downstream edge, and a second portion externally protruding along the third direction at an acute angle with the first portion, and the second lateral edge comprises a shape complementary to that of the first lateral edge to cooperate by nesting with a first lateral edge of a blade identical to said blade.

The second lateral edge having a shape complementary to that of the first lateral edge, it therefore comprises a first portion of second lateral edge extending from the upstream edge or the downstream edge, and a second portion of second lateral edge internally protruding along the third direction at an acute angle with said first portion of second lateral edge.

The invention thus offers a blade technology making it possible to self-generate the contact force necessary at high speed, in order to be subject to an overdimensioning of this force during mounting and at low speed, which overdimensioning is particularly severe for the static strength of the CMC blades.

Indeed, when a first and second adjacent blades are nested with each other, the second portion of the first lateral edge of the first blade, in other words the externally protruding portion, nests into the second portion of the second lateral edge of the second blade, that is to say in the internally protruding portion of the second blade. The acute angle formed between the first portion and the second portion of the first lateral edge of the first blade cooperates with the acute angle formed between the first portion and the second portion of the second lateral edge of the second blade to wedge the two blades together. The roots of the two blades are thus held together by contact, in particular when relative movements tend to separate the two roots along the third direction.

Furthermore, the first portion of the first lateral edge and the upstream edge or the downstream edge preferably form another angle comprised between 65° and 115°. In other words, the first portion of the first lateral edge extends from the upstream edge or the downstream edge at an angle comprised between 65° and 115°, for example an angle of 90°.

According to a first aspect of the blade, said downstream edge can extend parallel to said upstream edge and have a length, along the third direction, identical to that of said upstream edge, said downstream edge including a first end and a second end and said upstream edge including a first end and a second end, the first end of said downstream edge being located, along the third direction, between the first and second ends of said upstream edge, the second end of said upstream edge being located, along the third direction, between the first and second ends of said downstream edge.

The offset between the upstream edge and the downstream edge makes it possible to follow the curvature of the airfoil.

According to a second aspect of the blade, the first lateral edge can comprise a Z-shaped profile and the second lateral edge can comprise a Z-shaped profile complementary to the Z-shaped profile of the first lateral edge.

The Z-shaped profile makes it possible to form an acute angle of the first open lateral edge facing the downstream edge of the blade. The orientation of the acute angle of the first lateral edge is thus suitable for a blade configuration with a natural torsion of the airfoil in the counterclockwise direction as the blades move closer to or away from each other during the operation of the bladed wheel on which the blade is mounted.

According to a third aspect of the blade, the first portion of the first lateral edge can extend from said downstream edge between a downstream end of the first portion secured to the downstream edge and an upstream end of the first portion, and the second portion of the first lateral edge can comprise a first section and a second section, said first section extending from said upstream edge between an upstream end of the first section secured to said upstream edge and a downstream end of the first section, and said second section extending between said downstream end of said first section and said upstream end of said first portion, said second section forming a first acute angle with said first portion and a second acute angle with said first section.

According to a fourth aspect of the blade different from the second and third aspects, the first portion of the first lateral edge can extend from said upstream edge between an upstream end of the first portion secured to said upstream edge and a downstream end of the first portion, and the second portion can comprise a first part externally protruding along the third direction from the downstream end of the first portion at an acute angle with the first portion, and a second part between said downstream edge and the first part, the second part of said first lateral edge being located, along the third direction, between the first and second ends of said upstream edge.

This profile makes it possible to form an acute angle of the first open lateral edge facing the upstream edge of the blade this time. The orientation of the acute angle of the first lateral edge is thus suitable for a blade configuration with a natural torsion of the airfoil in the counterclockwise direction as the blades move closer to or away from each other during the operation of the bladed wheel on which the blade is mounted.

According to a fifth aspect of the blade, the blade can be made of ceramic matrix composite material.

According to a sixth aspect of the blade, the blade can be a blade for a moving bladed wheel of a turbomachine turbine.

The invention also relates to a turbomachine turbine comprising a moving bladed wheel mounted in rotation about a central axis, the bladed wheel comprising an annular ring of blades as defined above.

The invention also relates to a turbomachine comprising a turbomachine turbine as defined above.

The invention also relates to an aircraft comprising at least one turbomachine as defined above.

BRIEF DESCRIPTION OF THE DRAWINGS

FIG. 1, already described, is a schematic view of a low-pressure turbine portion of a turbomachine according to the state of the art.

FIG. 2, already described, is a perspective view of a blade of the low-pressure turbine of FIG. 1.

FIG. 3, already described, is a schematic top view of the blade illustrated in FIG. 2.

FIG. 4, already described, is a schematic perspective view of the upper part of an assembled ring portion of the low-pressure turbine of FIG. 1.

FIG. 5 shows a schematic sectional view of a blade according to a first embodiment of the invention.

FIG. 6 shows a schematic sectional view of an assembly of blades of FIG. 5.

FIG. 7 shows a schematic sectional view of a blade according to a second embodiment of the invention.

FIG. 8 shows a schematic sectional view of an assembly of blades in FIG. 7.

DESCRIPTION OF THE EMBODIMENTS

FIG. 5 represents a schematic sectional view of a blade 100 according to a first embodiment of the invention.

The blade 100 according to the invention is intended to be mounted on a bladed wheel of a turbomachine turbine such as the low-pressure turbine 4 of the turbomachine of FIG. 1.

In the first embodiment, the blade 100 comprises an airfoil 110, a blade base (not represented), and a root 120, the airfoil 110 extending along a first direction Z between the blade base and the root 120. When the blade 100 is mounted on a bladed wheel, the first direction Z corresponds to the radial direction of the bladed wheel, and the root 120 is located, along the radial direction of the bladed wheel, at the radially outer end of the airfoil 110 and the blade base at the radially inner end of the airfoil 110.

The airfoil 110 comprises a leading edge 112, a trailing edge 114, an intrados side 116 and an extrados side 118.

The blade root 120 comprises a platform 121 extending in a plane orthogonal to the first direction Z. The platform 121 extends in a plane comprising a second direction X and a third direction Y orthogonal to each other. When the blade 100 is mounted on a bladed wheel, the second direction X corresponds to the axial direction around which the bladed wheel is rotating, and the third direction Y corresponds to the circumferential direction of the bladed wheel.

The platform 121 of the blade root 120 comprises an upstream edge 122, a downstream edge 123, a first lateral edge 124 and a second lateral edge 125. The platform 121 is thus delimited, on the one hand, along the second direction X by the upstream edge 122 and the downstream edge 123 and, on the other hand, along the third direction Y by the first lateral edge 124 and the second lateral edge 125. The leading edge 112 of the airfoil 110 is near and facing the upstream edge 122 of the platform 121, while the trailing edge 114 of the airfoil 110 is near and facing the downstream edge 123 of the platform 121. The extrados side 118 of the airfoil 110 is facing the first lateral edge 124 of the platform 121, while the intrados side 116 of the airfoil 110 is facing the second lateral edge 125 of the platform.

In the first embodiment illustrated in FIG. 5, the first lateral edge 124 comprises a first portion 1241 extending perpendicularly along the second direction X from the upstream edge 122, and a second portion 1242 extending between the first portion 1241 of the first lateral edge 124 and the downstream edge 123. The first portion 1241 of the first lateral edge 124 comprises, in the second direction X, a second upstream end 1243 secured to the upstream edge 122 and a downstream edge 1244 secured to the second portion 1242 of the first lateral edge 124.

The second portion 1242 of the first lateral edge 124 comprises a first part 1245 externally protruding along the third direction Y from the downstream end 1244 of the first portion 1241 at a first acute angle $\alpha_1$ with the first portion 1241 of the first lateral edge 124. The second portion 1242 of the first lateral edge 124 also comprises a second part 1246 extending parallel to said first portion 1241 of the first lateral edge 124 and extending between the downstream edge 123 and the first part 1245 of the first lateral edge 124.

By externally protruding, it is meant a protruding part of the first lateral edge 124 extending in the opposite direction to the second lateral edge 125.

The first part 1245 of the second portion 1242 of the first lateral edge 124 comprises three segments 1247, 1248, 1249. The second segment 1248 of the first part 1245 of the second portion 1242 of the first lateral edge 124 extends parallel to the first portion 1241 between an upstream end 1248a of the second segment 1248 secured to the first segment 1247 and a downstream end 1248b of the second segment 1248 secured to the third segment 1249 of the first part 1245. The first segment 1247 and the third segment 1249 of the first part 1245 of the second portion 1242 of the first lateral edge 124 extend parallel to each other. The first segment 1247 extends between the downstream end 1244 of the first portion 1241 of the first lateral edge 124 and the upstream end 1248a of the second segment 1248 and forms the first angle $\alpha_1$ with the first portion 1241 of the first lateral edge 124. The third segment 1249 extends between the downstream end 1248b of the second segment 1248 and the second part 1246. The third segment 1249 forms an angle complementary to the first angle $\alpha_1$ with the second part 1246 of the second portion 1242 of the first lateral edge 124.

Furthermore, the upstream edge 122 comprises, along the third direction Y, a first end 1221 secured to the first end 1243 of the first portion 1241 of the first lateral edge 124 and a second end 1222 secured to the second lateral edge 125. The second part 1246 of the first lateral edge 124 is located, along the third direction Y, between the first end 1221 of the upstream edge 122 and the second end 1222 of the upstream edge 122.

The second lateral edge 125 comprises a first portion 1251 extending perpendicularly along the second direction X from the upstream edge 122, and a second portion 1252 extending between the first portion 1251 of the second lateral edge 125 and the downstream edge 123. The first portion 1251 of the second lateral edge 125 comprises, in the second direction X, an upstream end 1253 secured to the upstream edge 122 and a downstream end 1254 secured to the second portion 1252 of the second lateral edge 125.

The second portion 1252 of the second lateral edge 125 comprises a first part 1255 internally protruding along the third direction Y from the downstream end 1254 of the first portion 1251 at a second acute angle $\alpha_2$ with the first portion 1251 of the second lateral edge 125. The first angle $\alpha_1$ and the second angle $\alpha_2$ have the same value $\alpha$. The second portion 1252 of the second lateral edge 125 also comprises a second part 1256 extending parallel to said first portion 1251 of the second lateral edge 125 between the downstream edge 123 and the first part 1255 of the second lateral edge 125.

By internally protruding, it is meant a protruding part of the second lateral edge 125 extending towards the first lateral edge 124.

The first part 1255 of the second portion 1252 of the second lateral edge 125 comprises three segments 1257, 1258, 1259. The second segment 1258 of the first part 1255 of the second portion 1252 of the second lateral edge 125 extends parallel to the first portion 1251 of the second lateral edge 125 between an upstream end 1258a of the second segment 1258 secured to the first segment 1257 and a downstream end 1258b of the second segment 1258 secured to the third segment 1259 of the first part 1255 of the second portion 1252 of the second lateral edge. The first segment 1257 and the third segment 1259 of the first part 1255 of the second portion 1252 of the second lateral edge 125 extend parallel to each other. The first segment 1257 extends between the downstream end 1254 of the first portion 1251 of the second lateral edge 125 and the upstream end 1258a of the second segment 1258 of the first part 1255 of the second portion 1252 of the second lateral edge 125, and forms the second angle $\alpha_2$ with the first portion 1251 of the second lateral edge 125. The third segment 1259 of the first part 1255 of the second portion 1252 of the second lateral edge 125 extends between the downstream end 1258b of the second segment 1258 and the second part 1256 of the second portion 1252 of the second lateral edge 125. The third segment 1259 of the first part 1255 of the second portion 1252 of the second lateral edge 125 forms an angle complementary to the second angle $\alpha_2$ with the second part 1256 of the second portion 1252 of the second lateral edge 125.

Furthermore, the downstream edge 123 comprises, along the third direction Y, a first end 1231 secured to the second part 1246 of the second portion 1242 of the first lateral edge 124 and a second end 1232 secured to the second part 1256 of the second portion 1252 of the second lateral edge 125. The second end 1222 of the upstream edge 122 is located, along the third direction Y, between the first end 1231 of the downstream edge 123 and the second end 1232 of the downstream edge 123.

As illustrated in FIG. 6, when a plurality of blades 100 are assembled together to form an annular ring, the first lateral edge 124 of a first blade 100 cooperates with the second lateral edge 125 of a second blade 100 adjacent to the first blade 100 along the third direction Y, the externally protruding second portion 1242 of the first lateral edge 124 of the first blade 100 nesting into the internally protruding second portion 1252 of the second lateral edge 125 of the second blade 100, and the first segment 1247 of the first part 1245 of the second portion 1242 of the first lateral edge 124 being in contact with the first segment 1257 of the first part 1255 of the second portion 1252 of the second lateral edge 125 of the second blade 100.

This embodiment is thus suitable for a blade configuration where the adjacent roots move away from each other during the operation of the bladed wheel on which the blade is mounted, and where the natural torsion of the airfoil is in the counterclockwise direction in the plane comprising the second and third directions X and Y.

FIG. 7 represents a schematic sectional view of a blade 200 according to a second embodiment of the invention.

The blade 200 according to the invention is intended to be mounted on a bladed wheel of a turbomachine turbine such as the low-pressure turbine 4 of the turbomachine of FIG. 1.

In the second embodiment, the elements strictly identical to the blade 100 according to the first embodiment illustrated in FIG. 5 bear the same references.

The blade 200 according to the second embodiment comprises an airfoil 110, a blade base (not represented), and a root 220, the airfoil 110 extending along a first direction Z between the blade base and the root 220. When the blade 200 is mounted on a bladed wheel, the first direction Z corresponds to the radial direction of the bladed wheel, and the root 220 is located, along the radial direction of the bladed wheel, at the radially outer end of the airfoil 110 and the blade base at the radially inner end of the airfoil 110.

The airfoil 110 comprises a leading edge 112, a trailing edge 114, an intrados side 116 and an extrados side 118.

The blade root 220 comprises a platform 221 extending in a plane orthogonal to the first direction Z. The platform 221 extends in a plane comprising a second direction X and a third direction Y orthogonal to each other. When the blade 200 is mounted on a bladed wheel, the second direction X corresponds to the axial direction around which the bladed wheel is rotating, and the third direction Y corresponds to the circumferential direction of the bladed wheel.

The platform 221 of the blade root 220 comprises an upstream edge 122, a downstream edge 123, a first lateral edge 224 and a second lateral edge 225. The platform 221 is thus delimited, on the one hand, along the second direction X by the upstream edge 122 and the downstream edge 123 and, on the other hand, along the third direction Y by the first lateral edge 224 and the second lateral edge 225. The leading edge 112 of the airfoil 110 is near and facing the upstream edge 122 of the platform 221, while the trailing edge 114 of the airfoil 110 is near and facing the downstream edge 123 of the platform 221. The extrados side 118 of the airfoil 110 is facing the first lateral edge 224 of the platform 221, while the intrados side 116 of the airfoil 110 is facing the second lateral edge 225 of the platform 221.

In the second embodiment illustrated in FIG. 7, the first lateral edge 224 comprises a first portion 2241 extending from the downstream edge 123, and a second portion 2242 extending between the upstream edge 122 and the first portion 2241 of the first lateral edge 224. The first portion 2241 extends at an angle with the second direction X comprised between 0° and 40°, and preferably between 10° and 30°. The first portion 2241 of the first lateral edge 224 comprises, in the second direction X, an upstream end 2243 secured to the second portion 2242 of the first lateral edge 224 and a downstream end 2244 secured to the downstream edge 123.

The second portion 2242 of the first lateral edge 224 comprises a first part 2245 forming a segment and externally protruding along the third direction Y from the upstream end 2243 of the first portion 2241 at a first acute angle $\alpha_1$ with the first portion 2241 of the first lateral edge 224. The second portion 2242 of the first lateral edge 224 also comprises a second part 2246 forming a segment extending parallel to said first portion 2241 of the first lateral edge 224 and extending between the upstream edge 122 and the first part 2245 of the first lateral edge 224.

By externally protruding, it is meant a protruding part of a part of the first lateral edge 224 extending in the opposite direction to the second lateral edge 225.

The second part 2246 of the second portion 2242 of the first lateral edge 224 extends parallel to the segment formed by the first portion 2241 between an upstream end 2246a and a downstream end 2246b. The upstream edge 122 comprises, along the third direction Y, a first end 1221 secured to the upstream end 2246a of the second part 2246 of the second portion 2242 of the first lateral edge 224 and a second end 1222 secured to the second lateral edge 225.

The first part 2245 of the second portion 2242 of the first lateral edge 224 forms a segment extending between the downstream end 2246b of the second part 2246 of the second portion 2242 of the first lateral edge 224 and the upstream end 2243 of the first portion 2241 of the first lateral edge 224.

In addition to forming a first angle $\alpha_1$ with the segment formed by the first portion 2241 of the first lateral edge 224, the segment formed by the first part 2245 of the second portion 2242 of the first lateral edge 224 forms a second angle $\alpha_2$ with the segment formed by the second part 2246 of the second portion 2242 of the first lateral edge 224. Given that the segment formed by the second part 2246 of the second portion 2242 of the first lateral edge 224 and the segment formed by the first part 2241 are parallel to each other, the first angle $\alpha_1$ and the second angle $\alpha_2$ have the same value $\alpha$.

The first portion 2241 of the first lateral edge 224 is located, along the third direction Y, between the first end 1221 of the upstream edge 122 and the second end 1222 of the upstream edge 122. Furthermore, the downstream edge 123 comprises, along the third direction Y, a first end 1231 secured to the downstream end 2244 of the first portion 2241 of the first lateral edge 224 and a second end 1232 secured to the second lateral edge 225. The upstream edge 122 and the downstream edge 123 have the same length along the third direction Y. The first end 1231 of the downstream edge 123 is located, along the third direction Y, between the first end 1221 of the upstream edge 122 and the second end 1222 of the upstream edge 122.

The second lateral edge 225 comprises a first portion 2251 extending from the downstream edge 123, and a second portion 2252 extending between the upstream edge 122 and the first portion 2251 of the second lateral edge 225. The first portion 2251 of the second edge lateral 225 extends at an angle with the second direction X comprised between 0° and 40°, and preferably between 10° and 30°. The first portion 2251 of the second lateral edge 225 comprises, in the second direction X, an upstream end 2253 secured to the second portion 2252 of the second lateral edge 225 and a downstream end 2254 secured to the downstream edge 123.

The second portion 2252 of the second lateral edge 225 comprises a first part 2255 forming a segment and internally protruding along the third direction Y from the upstream end 2253 of the first portion 2251 at an acute angle, with the first portion 2251 of the second edge lateral 22, identical to said first angle $\alpha_1$. The second portion 2252 of the second lateral edge 225 also comprises a second part 2256 forming a segment extending parallel to said first portion 2251 of the second lateral edge 225 and extending between the upstream edge 122 and the first part 2255 of the first lateral edge 225.

By internally protruding, it is meant a protruding part of the second lateral edge 225 extending towards the first lateral edge 224.

The second part 2256 of the second portion 2252 of the second lateral edge 225 extends parallel to the segment formed by the first portion 2251 of the second lateral edge between an upstream end 2256a and a downstream end 2256b. The second end 1222 of the upstream edge 122 is secured to the upstream end 2256a of the second part 2256 of the second portion 2252 of the second lateral edge 225.

The first part 2255 of the second portion 2252 of the second lateral edge 225 forms a segment extending between the downstream end 2256b of the second part 2256 of the second portion 2252 of the second lateral edge 225 and the upstream end 2253 of the first portion 2251 of the second lateral edge 225.

In addition to forming a first angle $\alpha_1$ with the segment formed by the first portion 2251 of the second lateral edge 225, the segment formed by the first part 2255 of the second portion 2252 of the second lateral edge 225 forms a second angle $\alpha_2$ with the segment formed by the second part 2256 of the second portion 2252 of the second lateral edge 225. Given that the segment formed by the second part 2256 of the second portion 2252 of the second lateral edge 225 and the segment formed by the first part 2251 are parallel to each other, the first angle $\alpha_1$ and the second angle $\alpha_2$ have the same value $\alpha$.

The second part 2256 of the second portion 2252 of the second lateral edge 225 is located, along the third direction Y, between the first end 1231 of the downstream edge 123 and the second end 1232 of the downstream edge 123. Furthermore, the second end 1232 of the downstream edge 123 is secured to the downstream end 2254 of the first portion 2251 of the second lateral edge 225.

As illustrated in FIG. 8, when a plurality of blades 200 according to the second embodiment are assembled together to form an annular ring, the first lateral edge 224 of a first blade 200 cooperates with the second lateral edge 225 of a second blade 200 adjacent to the first blade 200 along the third direction Y, the externally protruding second portion 2242 of the first lateral edge 224 of the first blade 200 nesting into the internally protruding second portion 2252 of the second lateral edge 225 of the second blade 200, and the segment formed by the first part 2245 of the second portion 2242 of the first lateral edge 224 being in contact with the segment formed by the first part 2255 of the second portion 2252 of the second lateral edge 225 of the second blade 100.

This embodiment is suitable for a blade configuration where the adjacent roots move away from each other during the operation of the bladed wheel on which the blade is mounted, and where the natural torsion of the airfoil is in the clockwise direction in the plane comprising the second and third directions X and Y.

The invention thus offers a blade technology making it possible to self-generate the contact force necessary at high speed, in order to be subject to an overdimensioning of this force during mounting and at low speed, which overdimensioning is particularly severe for the static strength of the CMC blades.

The invention claimed is:
1. A turbomachine blade, the blade comprising an airfoil extending along a first direction between a first internal end and a second internal end, a blade base secured to the first internal end of the airfoil, and a root secured to the second internal end of the airfoil, the root including a platform delimited along a second direction perpendicular to said first direction by an upstream edge and a downstream edge and delimited along a third direction orthogonal to the first direction and to the second direction by a first lateral edge and a second lateral edge, the first lateral edge having, in a plane comprising the second and third directions, a shape complementary to the shape of the second lateral edge, the first lateral edge comprises a first portion and a second portion, the first portion extending from the upstream edge to the second portion, the second portion externally protruding along the third direction, the second portion comprising a first part and a second part, the first part comprising a first segment, a second segment, and a third segment, the first segment forming a first acute angle with the first portion, the second segment connected to the first segment and extends parallel to the first portion and the second part of the second portion, the third segment connected to the second segment and the second part of the second portion, the third segment extending parallel to the first segment, and the second part of the second portion extending from the downstream edge to the third segment of the first part of the second portion, wherein the second lateral edge comprises a third portion extending from the upstream edge, and a fourth portion internally protruding along the third direction at a second acute angle with the third portion.

2. The blade according to claim 1, wherein said downstream edge extends parallel to said upstream edge and has a length, along the third direction, identical to that of said upstream edge, said downstream edge including a first end and a second end and said upstream edge including a first end and a second end, the first end of said downstream edge being located, along the third direction, between the first and second ends of said upstream edge, the second end of said upstream edge being located, along the third direction, between the first and second ends of said downstream edge.

3. The blade according to claim 2, wherein the first portion of the first lateral edge extends from said upstream edge between an upstream end of the first portion secured to said upstream edge and a downstream end of the first portion.

4. The blade according to claim 1, wherein the blade is made of ceramic matrix composite material.

5. The blade according to claim 1, wherein the blade is a blade for a moving bladed wheel of a turbomachine turbine.

6. A turbomachine turbine comprising a moving bladed wheel mounted in rotation about a central axis, the bladed wheel comprising an annular ring of blades according to claim 1.

7. A turbomachine comprising a turbine according to claim 6.

8. An aircraft comprising at least one turbomachine according to claim 7.

9. A turbomachine blade, the blade comprising an airfoil extending along a first direction between a first internal end and a second internal end, a blade base secured to the first internal end of the airfoil, and a root secured to the second internal end of the airfoil, the root including a platform delimited along a second direction perpendicular to said first direction by an upstream edge and a downstream edge and delimited along a third direction orthogonal to the first direction and to the second direction by a first lateral edge and a second lateral edge, the first lateral edge having, in a plane comprising the second and third directions, a shape complementary to the shape of the second lateral edge, the first lateral edge comprises a first portion and a second portion, the first portion extending from the upstream edge to the second portion, the second portion externally protruding along the third direction, the second portion comprising a first part and a second part, the first part comprising a first segment, a second segment, and a third segment, the first segment forming a first acute angle with the first portion, the second segment connected to the first segment and extends parallel to the first portion and the second part of the second portion, the third segment connected to the second segment and the second part of the second portion, the third segment extending parallel to the first segment, and the second part of the second portion extending from the downstream edge to the third segment of the first part of the second portion.

10. The blade according to claim 9, wherein said downstream edge extends parallel to said upstream edge and has a length, along the third direction, identical to that of said upstream edge.

11. The blade according to claim 10, wherein the downstream edge including a first end and a second end and said upstream edge including a first end and a second end, the first end of said downstream edge being located, along the third direction, between the first and second ends of said upstream edge, the second end of said upstream edge being located, along the third direction, between the first and second ends of said downstream edge.

12. The blade according to claim 9, wherein the second lateral edge comprises a third portion extending from the upstream edge, and a fourth portion externally protruding along the third direction at a second acute angle with the third portion.

13. The blade according to claim 11, wherein the first portion of the first lateral edge extends from said upstream edge between an upstream end of the first portion secured to said upstream edge and a downstream end of the first portion.

14. The blade according to claim 9, wherein the blade is made of ceramic matrix composite material.

15. The blade according to claim 9, wherein the blade is a blade for a moving bladed wheel of a turbomachine turbine.

16. A turbomachine turbine comprising a moving bladed wheel mounted in rotation about a central axis, the bladed wheel comprising an annular ring of blades according to claim 9.

17. A turbomachine comprising a turbine according to claim 16.

18. An aircraft comprising at least one turbomachine according to claim 17.

* * * * *